(12) United States Patent
Yogev et al.

(10) Patent No.: US 6,530,369 B1
(45) Date of Patent: Mar. 11, 2003

(54) SOLAR ENERGY PLANT

(75) Inventors: Amnon Yogev, Rehovot (IL); Michael Epstein, Rishon le Zion (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 09/856,425

(22) PCT Filed: Nov. 25, 1999

(86) PCT No.: PCT/IL99/00634

§ 371 (c)(1),
(2), (4) Date: May 21, 2001

(87) PCT Pub. No.: WO00/33001

PCT Pub. Date: Jun. 8, 2000

(30) Foreign Application Priority Data

Nov. 30, 1998 (IL) .................................................. 127323

(51) Int. Cl.$^7$ ................................. F24J 2/02; F24J 2/08
(52) U.S. Cl. ......................... 126/680; 126/685; 126/690
(58) Field of Search ................................. 126/680, 684, 126/690, 696, 691, 578, 685, 599; 359/853, 870, 883, 848

(56) References Cited

U.S. PATENT DOCUMENTS

| | | | | |
|---|---|---|---|---|
| 4,035,065 A | * | 7/1977 | Fletcher et al. | 343/912 |
| 4,210,463 A | * | 7/1980 | Escher | 126/573 |
| 4,270,844 A | | 6/1981 | Cobble et al. | 350/294 |
| 4,395,582 A | | 7/1983 | Damsker | 136/248 |
| 4,608,964 A | * | 9/1986 | Russo | 126/624 |
| 5,578,140 A | * | 11/1996 | Yogev et al. | 126/572 |
| 5,592,932 A | * | 1/1997 | Yeomans | 126/600 |
| 5,787,878 A | * | 8/1998 | Ratliff, Jr. | 126/600 |
| 5,979,438 A | * | 11/1999 | Nakamura | 126/578 |
| 6,025,583 A | * | 2/2000 | Whitehead | 126/578 |
| 6,036,323 A | * | 3/2000 | Meijer | 126/685 |
| 6,080,927 A | * | 6/2000 | Johnson | 126/562 |
| 6,131,565 A | * | 10/2000 | Mills | 126/577 |
| 6,196,216 B1 | * | 3/2001 | Kooij | 126/621 |
| 6,231,197 B1 | * | 5/2001 | Nakamura | 126/569 |
| 6,302,100 B1 | * | 10/2001 | Vandenberg | 126/683 |

OTHER PUBLICATIONS

C.–J. Winter, R.L. Sizmann, L.L. Vant–Hull, *Solar Power Plant*, Springer–Verlag, Berlin, Hedelberg, 1991, pp. 96–98, 238.

Ari Rabl, Technical Note, *Tower Reflector for Solar Power Plant*, Solar Energy Group, Argonne National Library, pp. 269–271.

International Search Report No. PCT/IL 99/00634.
PCT Publication No. WO 95/21358.

* cited by examiner

Primary Examiner—Hahn Bennett
Assistant Examiner—Kathryn Ferko
(74) Attorney, Agent, or Firm—Fitch, Even, Tabin & Flannery

(57) ABSTRACT

A solar radiation concentrating system (1) comprises at least two reflectors (12, 16) successively arranged along an optical path (4) of the system (1) so that a first (12) of the two reflectors (12, 16) reflects the radiation towards a second (16) of the two reflectors (12, 16). The reflectors (12, 16) have such spectral characteristics as to be capable of highly reflecting the radiation in a reflection range of wavelengths and absorbing the radiation in an absorption range of wavelengths, wherein the absorption range of wavelengths of the first reflector (12) substantially includes the absorption range of wavelengths of the second reflector (16).

7 Claims, 1 Drawing Sheet

SOLAR ENERGY PLANT

FIELD OF THE INVENTION

The invention relates to a solar radiation concentrating system for use, for example, in a solar energy plant associated with a high-power solar energy receiver.

BACKGROUND OF THE INVENTION

A. Rabl, "Technical Note. Tower reflector for solar power plant", *Solar Energy*, Vol. 18, pp. 269–271, 1976) is one of the earliest publications disclosing a solar radiation concentrating system of the above kind. The system comprises a primary concentrator in the form of a heliostats field installed on the ground plane, a tower reflector mounted on a solar tower above the ground plane and a secondary concentrator associated with a solar receiver disposed adjacent the ground plane.

As acknowledged in the Rabl's disclosure, there exists a serious problem connected with a necessity to avoid overheating of the tower reflector which is to be exposed to the concentrated solar light of 100 suns or even more. With an ordinary construction of the reflector, based on metallic layers, the reflector requiring an intensive cooling thereof, which is quite difficult and onerous at high altitudes of the tower, would have absorbed a significant amount of this energy. In order to solve the overheating problem, Rabl suggests that the elements of the tower Fresnel reflector be in the form of rectangular prisms with total internal reflection.

U.S. Pat. No. 5,578,140 considers different disadvantages of the construction proposed by Rabl, which render it practically inapplicable, and suggests the provision of the tower reflector in the form of a sophisticated dielectric structure comprising a transparent substrate coated with a plurality of thin layers made of dielectric materials constituting highly reflective interference coating. The beam-splitting ability of the dielectric mirror makes its absorption coefficient negligible, whereby a necessity of cooling arrangements is eliminated. However, this solution is rather expensive.

It is the object of the present invention to provide a new solar radiation concentration system having advantages in the above respect.

SUMMARY OF THE INVENTION

In accordance with the present invention there is provided a solar radiation concentrating system comprising at least two reflectors successively arranged along an optical path of the system so that a first of said two reflectors reflects the radiation towards a second of said two reflectors, each reflector being capable of reflecting the radiation in a reflection range of wavelengths and absorbing the radiation in a absorption range of wavelengths, wherein the absorption range of wavelengths of said first reflector substantially includes the absorption range of wavelengths of said second reflector.

Thus, in system of the present invention the reflectors are chosen, according to their spectral characteristics, in such a manner that most of the reflection losses in the system will occur in the first reflector, which absorbs a significant fraction of the solar radiation within the absorption range of the second reflector, whereby the radiation which may be absorbed by the second reflector is practically excluded, or at least significantly reduced, in the radiation incident on the second reflector. The present invention takes advantage of the fact that glasses and metal coatings, of which reflectors of the kind used in the system of the present invention are usually made, have reflection and absorption properties depending on the spectrum of radiation incident thereon. Thus, for example, it is well known that Silver has high reflectivity at long wavelengths and significant absorption in the near UV range of wavelengths and Gold has absorption shifted to longer wavelengths. Also different glasses have different spectral behavior so that may options exist for the selection of spectral properties of the reflectors.

The idea of the present invention is contrary to the common practice according to which attempts have always been made to choose all reflectors with the highest possible reflection and minimal possible absorption. In the present invention, the advantage is being taken of the spectral behavior of the reflectors in order to control both the reflection and the absorption of radiation at each reflection stage of the system.

The solar energy concentrating system according to the present invention may be used in any system where successive concentrating devices are used, with the primary concentration being usually performed by a tracking mirror or lens and the final concentration being most often non-imaging. More complicated designs of the system according to the present invention ray include one or more intermediate reflectors as, for example, disclosed in the prior art publications considered above. In relatively small solar radiation concentrating systems, the primary concentrator may be in the form of a solar dish or trough, whilst in large scale solar energy plants, the primary concentrator is in the form of a heliostats field.

The solar radiation concentrating system of the present invention is specifically advantageous for use in a large-scale solar energy plant having a heliostats field, a tower reflector and, preferably, a non-imaging concentrator associated with a solar receiver. Since the heliostats are exposed to non-concentrated solar radiation, they may easily withstand the excessive absorption of radiation without the risk of being destructed, whilst the tower reflector, in which the overheating problems are now being solved by the reduced absorption, may have any appropriate design.

The solar energy concentration system according to the present invention may have only two reflectors or rather may be based on several successive reflectors so that the spectral characteristics of each reflector are used to control thermal conditions of its successor, i.e. the reflectors may have absorption which is being successively reduced, and the reflection which is being successively increased, from one reflector to another along the optical path of the system, the reflection and absorption ranges of wavelengths of the reflectors being correlated accordingly.

DESCRIPTION OF THE DRAWING

For better understanding, the present invention will now be described, by way of example only, with reference to FIG. 1, which is a schematic illustration of a solar energy plant having a solar radiation concentration system, which may have a design according to the present invention.

DETAILED DESCRIPTION OF SPECIFIC EMBODIMENTS

Figure 1:
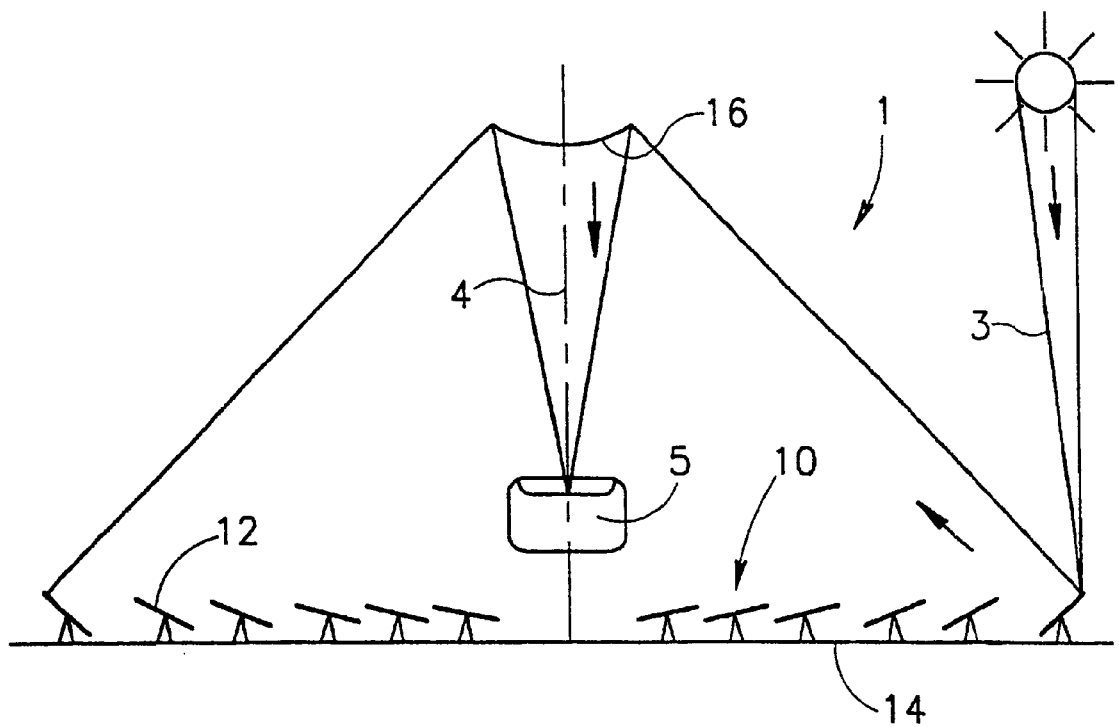

FIG. 1 schematically shows one example of use of a solar radiation concentration system of the present invention, in a solar energy plant. The solar energy plant and the solar radiation concentrating system are similar to those disclosed in U.S. Pat. No. 5,578,140 and, for the description of their general design, U.S. Pat. No. 5,578,140 is incorporated herein by reference.

With reference to FIG. 1, the solar radiation concentrating system 1 admits and concentrates the oncoming solar radiation 3 and directs the concentrated radiation, along an optical path 4, to a solar receiver 5.

As shown, the solar radiation concentrating system 1 comprises a primary concentrator in the form of a heliostats field 10 consisting of a plurality of concentrating reflectors 12 mounted on the ground plane 14 and a tower reflector 16 mounted substantially above the plane 14. As shown, the oncoming solar radiation 3 is concentrated and reflected by the heliostats field 10 in the direction of the tower reflector 16 so as to be redirected thereby onto the solar receiver 5. The system may further include a secondary concentrator (not shown) disposed in front of the solar receiver 5 and concentrating the radiation directed thereto by the tower reflector 16.

The concentrating reflectors 12 and the tower reflector 16 are designed to be capable of highly reflecting solar radiation in a reflection range of wavelengths and of absorbing solar radiation in an absorption range of wavelengths, the absorption range of the tower reflector 16 being substantially within the absorption range of the concentrating reflectors 12. Thereby, a significant fraction of the solar radiation within the absorption range of the tower reflector 16 will be absorbed by the concentrating reflectors 12 and will not be present in the radiation incident on the tower reflector 16.

It is suggested that the tower reflector be made of facets, which are preferably flat. The facets of the tower reflector maybe made of borosilicat glass with back metal coating. Since this glass is relatively stable with respect to thermal stresses, it can be used in the reflector's facets without any additional support. Alternatively, it may be economically advantageous to make the tower reflector facets of back silvered thin glass, which is attached to a thin metal support, preferably, by means of thermally conductive and environmentally stable glue. The support may also be made of a similar or identical glass, to minimize thermally induced bending of the facets. Alternatively, if the differences in thermal expansions of the glass and the metal support are significant, it may be desirable that the metal support's backside is associated with cooling fins or metal tubes to enhance connective cooling thereof. The facets of the tower reflector may also be made of a double layer of glass mirrors on two sides of a metal plate.

It is preferable that the tower reflector 16 has the reflectivity more than 96%, in which case its stagnant temperature will not exceed 100° C. at a wind of 2 m/sec and solar concentration of 40 suns. These are long term safe conditions for most metal-coated reflectors. When higher solar radiation concentrations are required and more than two successive reflectors are used, the selection of their successive reflections should lead to 97% reflection of the secondary or any farther reflectors.

In an experiment carried out at the heliostats field of the Weizmann Institute in Rehovot, Israel, the reflectivity of the heliostats was 85%. The heliostats reflected the radiation towards a solar tower reflector, the mirror being made of Borofloat glass and having a silver back coating. The reflectivity of the reflector measured with a pyroelectric detector, was about 97.5%. In a different experiment, reflectors of the same composition were exposed to concentrated solar radiation of 35–40 kW/m2 at wind speed up to 2 m/sec, and the temperature of the reflector recorded over several days did not exceed 80° C.

In all the above experiments, the backside of the tower reflector was coated with white acrylic paint with high emmisivity and very low absorption, in order to eliminate the absorption of solar radiation at the backside of the reflector and reduce its heating.

The solar radiation concentrating system according to the present invention is not restricted to the characteristics thereof described above but rather may have any other appropriate design.

What is claimed is:

1. A solar radiation concentrating system for use in a solar energy plant, comprising at least two reflectors successively arranged along an optical path of the system, a first of said two reflectors being a primary concentrator in the form of a heliostats field consisting of a plurality of primary concentrating reflectors installed substantially on a ground plane, and a second of said reflectors is a tower reflector mounted on a solar tower substantially above said ground plane, said primary concentrating reflectors being adapted to reflect solar radiation incident thereon towards said tower reflector and said tower reflector being adapted to redirect the radiation to a solar receiver mounted close to said ground plane, the reflectors having such spectral characteristics as to be capable of highly reflecting the radiation in a reflection range of wavelengths and absorbing the radiation in an absorption range of wavelengths, and wherein the absorption range of wavelengths of said concentrating reflectors substantially includes the absorption range of wavelengths of said tower reflector, whereby the radiation which might be absorbed by the tower reflector is essentially excluded from the radiation incident on the tower reflector due to which overheating of the tower reflector which otherwise would occur is avoided.

2. A system according to claim 1, wherein said second reflector is capable of reflecting most of the radiation emerging from the first reflector.

3. A system according to claim 1, wherein said second reflector has a backside coated with white paint having low absorption of the solar radiation spectrum and high emissivity in the IR range of wavelengths thereof.

4. A system according to claim 1, wherein the system is based on several successive reflectors and the spectral characteristics of each reflector is used to control the thermal conditions of the successive reflector.

5. A system according to claim 1, wherein said first reflector is in the form of a solar dish or trough.

6. A system according to claim 1, further including a secondary concentrator, which is preferably non-imaging.

7. In a solar energy plant having a heliostats field comprised of a plurality of concentrating reflectors and a tower reflector, a method of preventing the tower reflector from overheating by solar radiation concentrated by the concentrating reflectors of the heliostats field, the method including providing the absorption by the concentrating reflectors of the heliostats field of a significant fraction of the solar radiation within the absorption range of wavelengths of the tower reflector, directing the solar radiation concentrated and reflected by the concentrating reflectors towards the tower reflector, and providing a high reflection of said radiation by the tower reflector, whereby the radiation which might be absorbed by the tower reflector is essentially excluded from the radiation incident on the tower reflector.

* * * * *